UNITED STATES PATENT OFFICE.

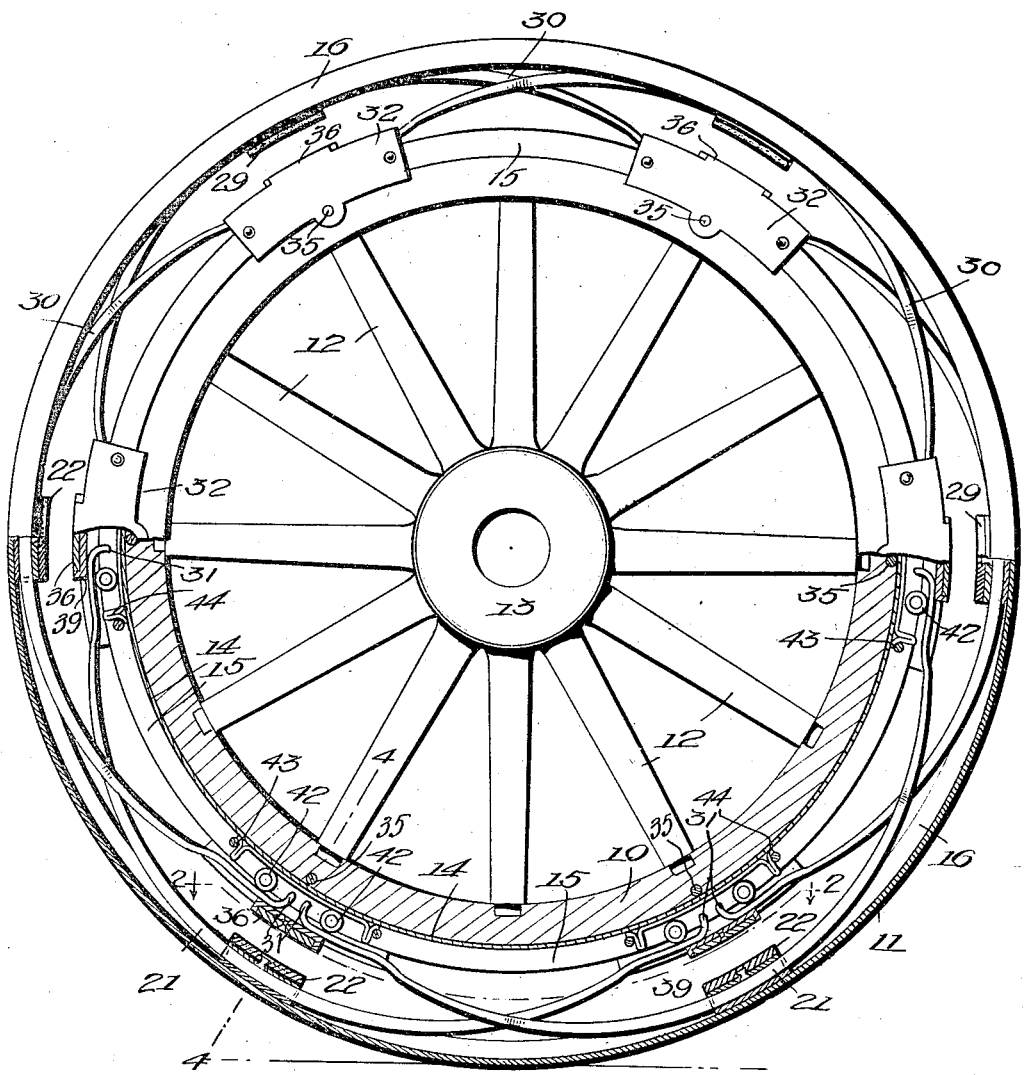

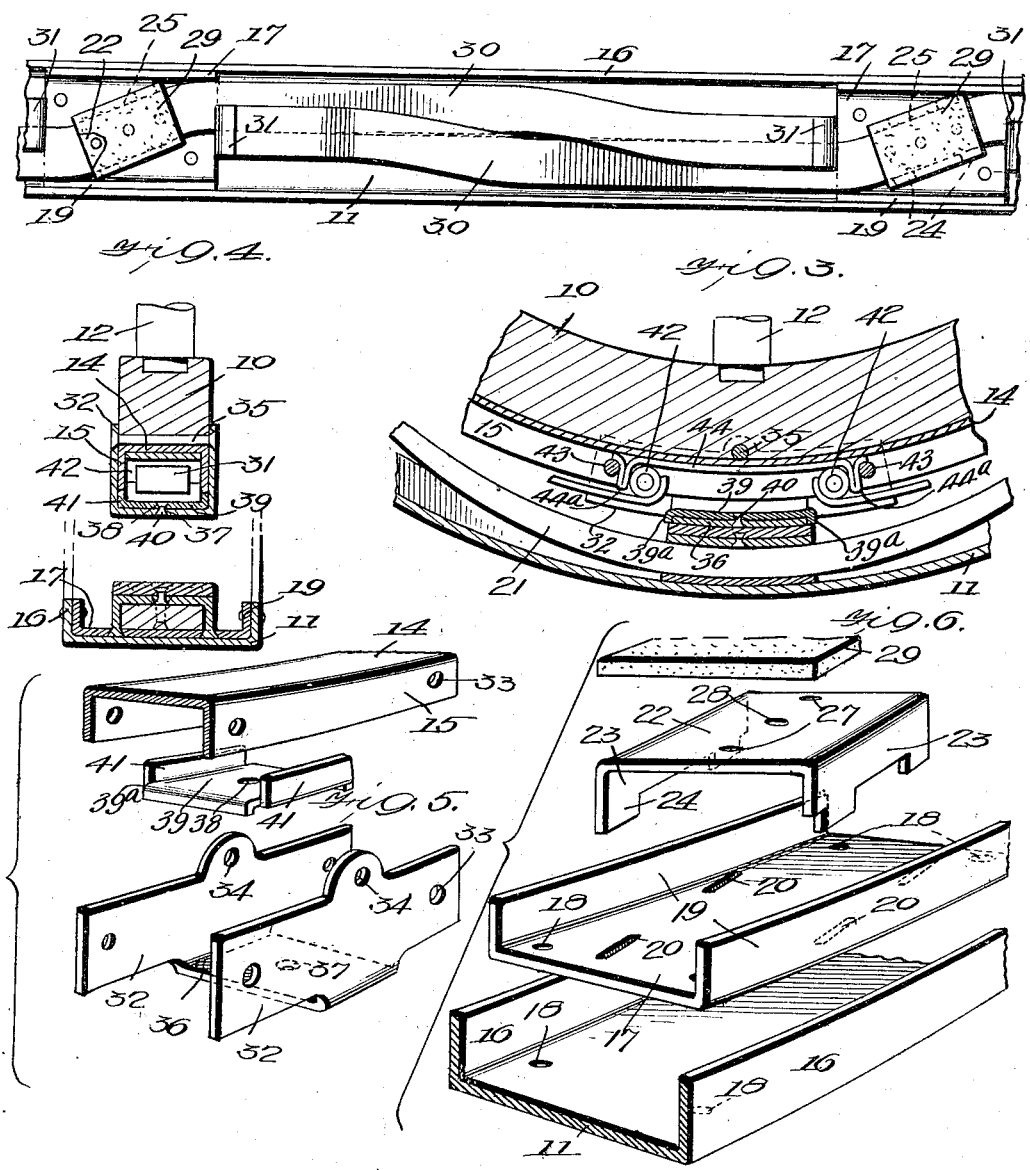

OTTO G. WORSLEY, OF AURORA, ILLINOIS.

SPRING-WHEEL.

1,244,681.  Specification of Letters Patent.  Patented Oct. 30, 1917.

Application filed January 20, 1917. Serial No. 143,474.

*To all whom it may concern:*

Be it known that I, OTTO G. WORSLEY, a citizen of the United States, and a resident of Aurora, in the county of Kane and State of Illinois, have invented a certain new and useful Improvement in Spring-Wheels, of which the following is a specification.

My present invention relates generally to spring wheels, and more particularly to that type of spring wheel including circumferentially spaced felly and rim portions with interposed shock absorbing means, my improvements being directed to such means, and having for their objects the provision of readily accessible and highly efficient spring members, the construction, disposition, and operation of which will promote uniform distribution of strain, effective transmission of rotary movement, and maximum elasticity with minimum breakage.

In the accompanying drawings illustrating my invention, and forming a part of this specification:

Figure 1 is a view partly in side elevation and partly in vertical section, illustrating a spring wheel constructed in accordance with my invention;

Fig. 2 is a partial, circumferential section taken substantially on line 2—2 of Fig. 1;

Fig. 3 is a sectional view taken on a median line, with the parts under compression;

Fig. 4 is a radial section taken substantially on line 4—4 of Fig. 1;

Fig. 5 is a perspective view illustrating the several portions of one of the felly carried spring bearings;

Fig. 6 is a similar view of the several portions of one of the spring connecting means of the rim, and Fig. 7 is a plan view of one of the springs removed.

Referring now to these figures, the circumferentially spaced felly and rim are respectively indicated at 10 and 11, and, as seen in Fig. 1, the felly 10 forming as it does a rigid part of the wheel, is supported at the ends of the usual spokes 12 extending from the hub 13.

In accordance with my invention, the felly 10 is provided with a channeled felly plate 14 having outwardly projecting side flanges 15, and the spaced rim 11 is similarly channeled, with inwardly projecting side flanges 16.

At equidistantly spaced points around the rim 11 are mounted spring securing means, each including a rim plate 17 adapted for disposition flatwise against the inner peripheral face of the rim 11, and to be secured by rivets or like fastening members extending through the openings 18, the rim plate 17 having side flanges 19 within the side flanges 16 of the rim, and being provided with slotted openings 20 angularly disposed with respect to its longitudinal axis.

The rim plate 17 with its flanges 19 thus protects the rim 11 and its flanges 16 from contact with the secured spring, one of the series of springs 21, which is disposed within the channeled rim plate and riveted at its inner face against the outer face of a housing plate 22 having side flanges 23 to extend outwardly between the side flanges 19 of the rim plate and provided with projecting lugs 24 for extension through and riveting within the slots 20, the rivets or like fastening members securing the intermediate annular portion 25 of the spring 21, being passed through openings 26 of said angular portion and through openings 27 of the housing plate 22.

The housing plate 22 is also provided with a central opening 28 in order that a buffer piece 29 may be riveted or otherwise secured against its inner face for a purpose to be presently described, this buffer to be formed of leather or other material suitable for the purpose.

The angular disposition of the housing plates 22 with respect to the rim plate 17 in which they are mounted, thus accommodates the central angular portions 25 of the springs 21, so as to permit the offset extensions 30 of the springs, best seen in Fig. 7, to cross one another in laterally juxtaposed relation, and permit of their operation when desired in their circumferentially lapping respect to one another throughout the series.

As seen by reference to Fig. 1, the particular manner of securing the springs as above described, and their relative disposition in the space between the felly 10 and rim 11, with their curvature, brings the ends of their offset extensions to bear upon the outer surface of the felly, the inner bearing extremities of the springs having inturned hooks 31 for a purpose to be presently described.

It will be furthermore seen, from reference to Fig. 1, that the particular relative disposition of the springs, brings the hook extremities 31 of alternate springs in contiguous relation to the felly 10 and to one another, at points opposite the central secured portions of the spring therebetween, bearing members being disposed at these points of the felly 10, in which the extremities of the springs are freely movable.

Each of these bearing members consists of a pair of side pieces 32, best seen in Fig. 5, extending along and beyond the outer faces of the side flanges 15 of the felly plate 14, and secured thereto by suitable clasping members, such as bolts or rivets, through alined openings 33 of said side pieces 32 and said flanges 15, the side pieces 32 being further provided at their inner edges with intermediate projecting lugs having apertures 34 for the reception of a bolt or rivet 35 extending through the felly 10 adjacent the inner face of the felly plate 14.

As further seen in Fig. 5, the side plates 32 are connected at their outer edges by a transverse bridge piece 36, integral therewith and thus spaced outwardly beyond the outer edges of the flanges 15 of the felly plate 14, the said bridge piece having a central aperture 37 for alinement with the central aperture 38 of a wear plate 39 disposed against the inner face of the said bridge piece 36, the apertures receiving a connecting rivet 40 as seen in Fig. 4, and the wear plate 39 having side flanges 41 engaging the outer edges of the side flanges 15 of the felly plate 14, so that a space is formed between the inner face of the wear plate 39 and the outer face of the felly plate 14, of sufficient size to permit of the reception and freely sliding movement of the hooked extremities 31 of the springs therein. Upon the ends of the wear plate 39 are flanges 39ª that fit over the edges of the bridge piece 36, as shown in Fig. 3.

Within the bearing spaces formed as just above described, are disposed free moving rollers 42, see Figs. 1 and 3, over and partially around which the hooked spring extremities 31 extend, so that the said spring ends will thus have free ready sliding movement on the rollers 42, between a central point of the respective bearing member, at which the spring ends contact with one another, and the outer rivets or bolts 43 connecting the side pieces 32 and extending through the openings 33 of said side pieces and the side flanges 15 of the felly plate 14. The rollers 42 run in contact with a wear plate 44 that lies against the felly plate 14 and extends between the rivets 43. The end portions 44ª of said wear plate constitute stops to prevent the rollers from leaving the bearing spaces.

It is thus obvious that, in use, the several springs 21 will be effectively protected at all times against injury under excessive pressure, by virtue of the engagement of the bearing and connecting members, as seen in Fig. 3, the shock and noise of such engagement being taken up by the buffer pieces 29 carried by the several connecting members as before described.

It is furthermore obvious that, connected as they are at their central portions to the rim, and with their extremities having freely movable bearings in the relation stated upon the felly, the springs 21 are well adapted to absorb shocks in use, effectively support the rim and felly in their normally spaced relation, and promote maximum elasticity with minimum breakage, attention being particularly called to the accessibility of all of the parts so constructed and disposed, whereby repairs and substitution of parts may be readily accomplished at all times.

I claim:

1. A spring wheel comprising circumferentially spaced felly and rim portions, a series of curved springs between said felly and rim, connecting members engaging the springs intermediate their ends and disposed at spaced points around the rim, and bearing members at spaced points around the felly opposite the said connecting members and in which the ends of the said springs are movable, said bearing members including side pieces carried by the felly and having outer bridge pieces directly opposing the said connecting members, and buffer pieces carried by the connecting members and interposed between the same and the said bridge pieces of the bearing members.

2. A spring wheel comprising circumferentially spaced felly and rim portions, a series of curved springs between said felly and rim, connecting members engaging the springs intermediate their ends and disposed at spaced points around the rim, and bearing members at spaced points around the felly opposite the said connecting members and in which the ends of the said springs are movable, said bearing members including side pieces carried by the felly and having outer bridge pieces directly opposing the said connecting members, and rollers freely movable in the space between the said bridge piece and felly and on which the ends of the spring are movable in the bearing.

3. A spring wheel comprising circumferentially spaced felly and rim portions, a series of curved springs between said felly and rim portions having hooks at their extremities, connecting members engaging the springs intermediate their ends and disposed at spaced points around the rim, and bearing members at spaced points around the felly opposite to the said connecting members, said bearing members having bridged bearing faces, and rollers having limited movement within the said bearing faces and engaged by the hook extremities of the springs movable within the said faces.

4. A spring wheel comprising circumferentially spaced felly and rim portions, a series of curved springs between said felly and rim portions, connecting members engaging the springs intermediate their ends and disposed at spaced points around the rim, and bearing members at spaced points around the felly opposite the said connecting members and in which the ends of the said springs are movable, said connecting members including a rim plate secured to the rim and in which the spring extends, a housing plate extending over the spring and secured to the said rim plate, and a buffer piece secured to said housing plate and directly opposite the respective bearing member.

5. A spring wheel comprising circumferentially spaced felly and rim portions, a series of bowed springs secured intermediate their ends at spaced points around the rim, bearing members at spaced points around the felly and in which the ends of said springs are movable, rollers movable in said bearing members and engaged by the spring ends, and a wear plate in each bearing member having end portions forming stops for said rollers.

6. A spring wheel comprising circumferentially spaced felly and rim portions, a flanged plate secured to the felly, a series of bowed springs secured intermediate their ends at spaced points around the rim, and bearing members at spaced points around the felly and in which the ends of the said springs are movable, each of said bearing members including bridged side plates, and a wear plate secured thereto and having inturned side flanges abutting the flanges of the said felly plate.

7. A spring wheel comprising circumferentially spaced felly and rim portions, a flanged plate secured to the felly, a series of springs secured intermediate their ends at spaced points around the rim, and bearing members at spaced points around the felly and in which the ends of the said springs are movable, each of said bearing members including side plates secured to and projecting outwardly beyond said flanged felly plate, a bridge piece connecting the outer edges of said side plates, and a wear plate secured to the bridge piece and having flanges engaging the edges of the bridge piece and other flanges abutting the flanges of said felly plate.

8. A spring wheel comprising circumferentially spaced felly and rim portions, a series of curved springs between said felly and rim portions, connecting members engaging the springs intermediate their ends and disposed at spaced points around the rim, and bearing members at spaced points around the felly opposite the said connecting members, and in which the ends of the said springs are movable, said connecting members including a slotted rim plate secured to the rim and in which the spring extends, and a housing plate extending over the spring and having extensions secured through the slots of the rim plate.

OTTO G. WORSLEY.

Copies of this patent may be obtained for five cents each, by addressing the "Commissioner of Patents, Washington, D. C."